United States Patent [19]

Mancewicz et al.

[11] Patent Number: 4,898,046

[45] Date of Patent: Feb. 6, 1990

[54] CONTROL CABLE

[75] Inventors: James M. Mancewicz, Kent City; William R. Bosworth, Jr., Hudsonville, both of Mich.

[73] Assignee: Grand Rapids Controls, Inc., Rockford, Mich.

[21] Appl. No.: 128,034

[22] Filed: Dec. 3, 1987

[51] Int. Cl.⁴ ................... B32B 15/00; F16C 1/10
[52] U.S. Cl. ..................... 74/502.5; 428/35.9; 428/377; 428/379
[58] Field of Search .......... 74/502.5; 428/35, 36, 428/377, 375, 379; 138/109, 127; 156/149

[56] References Cited

U.S. PATENT DOCUMENTS

| | | | |
|---|---|---|---|
| 2,787,917 | 4/1957 | Schroeder | 74/502.5 |
| 3,135,130 | 6/1964 | Bentley | 74/502.5 X |
| 3,135,132 | 6/1964 | Bratz | 74/502.5 X |
| 3,435,107 | 3/1969 | Conrad | 74/502.5 X |
| 4,088,156 | 5/1978 | Kubo et al. | 74/502.5 X |
| 4,384,595 | 5/1983 | Washkewicz et al. | 428/36 X |
| 4,722,210 | 2/1988 | LucBourgois et al. | 138/127 X |

Primary Examiner—Lorraine T. Kendell
Attorney, Agent, or Firm—Waters, Morse & Harrington

[57] ABSTRACT

A highly flexible and cost effective stranded conduit for a control cable assembly comprises about twenty-one (21) to thirty (30) individual strands of low carbon SAE 1005 to 1040 steel wire wrapped in a contiguous helical configuration about a plastic resin liner at a pitch of 0.5 to 3.0 inches, with the individual strands of wire having a diameter of 0.008 to 0.020 inches. The wire layer is surrounded by a jacket material formed of an abrasion resistant plastic resin.

12 Claims, 1 Drawing Sheet

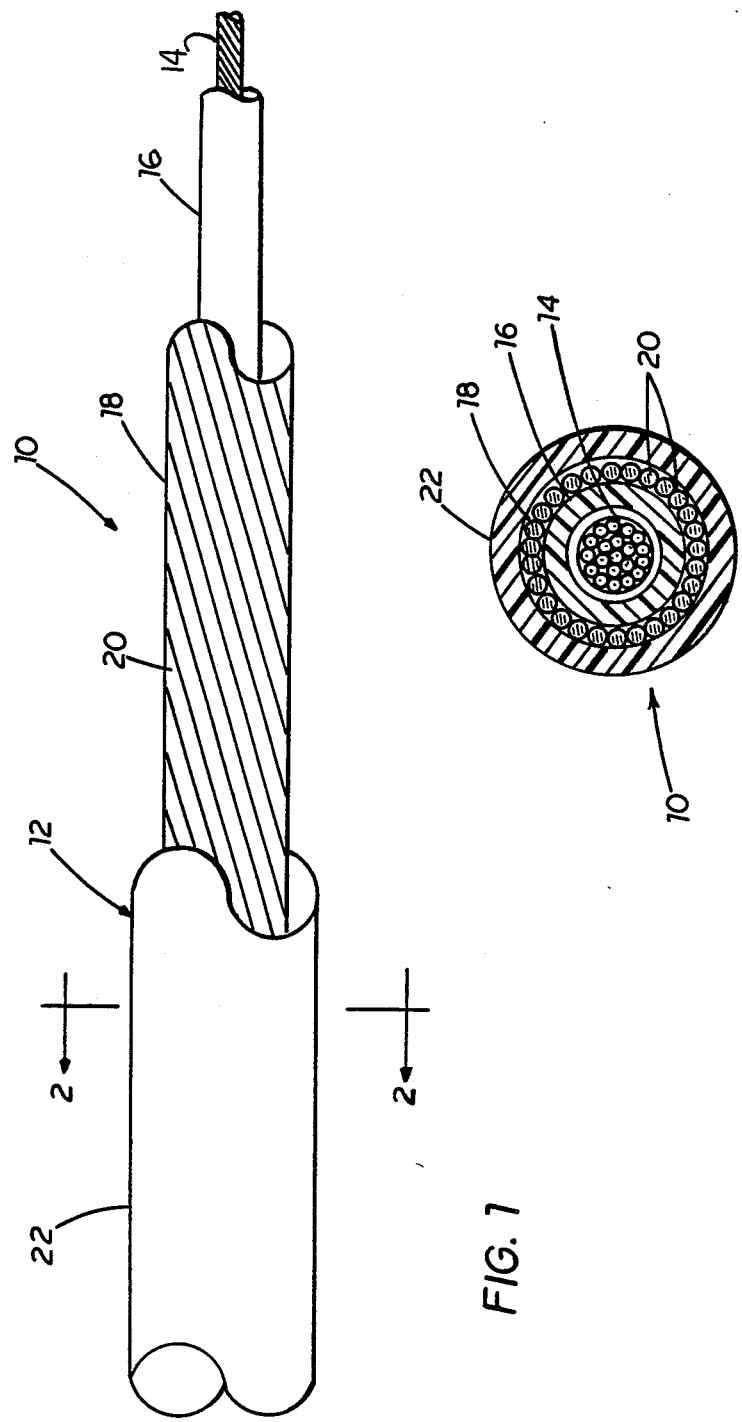

CONTROL CABLE

BACKGROUND OF THE INVENTION

This invention relates to control cables and more particularly to an improved straned conduit for a control cable.

Control cables are used for a wide variety of applications. A typical cable assembly comprises a reinforced tubular conduit and an interior core wire that slides longitudinally inside the conduit. The core wire may be a multi-stranded cable, which is primarily used for tension applications, or it can be a solid wire, which is used for push-pull applications.

A conventional conduit for a cable assembly comprises a plastic inner liner designed to provide good slip characteristics with respect to the core wire; a wire reinforcement layer; and an abrasion resistant jacket extruded or otherwise formed over the reinforcement layer.

The reinforcement layer can be formed in several ways. The reinforcement layer can be an open weave braided cable; it can be a closed helix formed of a single strand of flat or round wire; or it can be a so-called "stranded" conduit, wherein a plurality of parallel, wire strands are wrapped in an open or closed helical fashion around the liner at a predetermined "pitch". The term "pitch" refers to the slope of the helix with respect to a line perpendicular to the axis of the helix and tangent to the exterior surface of the helix. The value of the pitch can be expressed as a slope angle or it can be defined (more commonly) as the axial length of one complete loop of the helix of one wire strand. Both types of measurements are used herein.

Stranded conduit is widely used in a number of applications, including automotive control cables. In one common construction of such a cable, the wire strands or lay wires in the reinforcement layer are formed of a hardened steel known as oil tempered wire or low grade music wire having a carbon content of about SAE 1065. The construction typically employs twenty (20) strands or less, with each strand being at least 0.016 inches in diameter. The strands can be wound in an open or closed helical fashion at a wide range of pitches. The high carbon steel reinforcement layer in such conduit makes such cables resistant to crimping or kinking upon bending and resists denting when the cable is subjected to a crushing force. The reinforcement layer thus makes it possible for the core wire to continue to slide freely in the conduit, even when the conduit is hit or bent sharply.

Heretofore, it has been believed that high carbon steel is essential in order to provide sufficient protection for the core wire. However, the high carbon steel has several drawbacks, in particular hardened steel conduit lacks a high degree of flexibility and is expensive.

The specifications for certain cable assemblies used in automotive applications require such a high degree of flexibility, combined with performance, deformation, and cost criteria, that conventional high carbon steel stranded conduit cannot meet all criteria of these specifications.

It is an object of the present invention to provide an improved stranded conduit that has adequate strength and improved flexibility and yet is less expensive than conduit employing hardened steel wire.

SUMMARY OF THE INVENTION

In accordance with the present invention, an improved stranded conduit for a control cable employs a wire reinforcing layer formed of wire strands (lay wires) of low carbon steel (desirably SAE 1005 to 1040) wrapped in a helical configuration about a liner at a pitch of about 0.50 to 3.0 inches (depending on wire hardness, liner diameter and wire strand diameter). The individual wire strands in the wire reinforcing layer are about 0.008 to 0.020 inches in diameter, with thinner wire strands of about 0.010 to 0.014 inches being preferred. Desirably, the conduit comprises about twenty-one (21) to thirty (30) individual wire strands, with the wire strands being wrapped contiguously about the liner in a closed helical fashion.

The lay wires are surrounded by a conventional jacket material preferably formed of an abrasion resistant plastic resin.

In the fabrication of the stranded conduit of the present invention, the penetration and deflection characteristics of the conduit are enhanced by wrapping the wire strands snugly around the liner in the construction of the conduit.

While conventional thinking would be that soft steel wire would have unsatisfactory penetration resistance and deflection resistance to insure that the core wire of the cable assembly will slide easily in the conduit, when the conduit is constructed with an increased number of thin wire strands than used in hard wire stranded conduit and when the pitch of the conduit is selected at a critical range, the conduit has desirable penetration and deflection characteristics while at the same time exhibiting superior and very desirable flexibility characteristics. The pitch of the lay wires is important because a pitch that is too small causes a conduit to act like a spring and stretch or axially elongate, whereas a pitch that is too long provides insufficient deflection and penetration strength.

BRIEF DESCRIPTION OF DRAWINGS

FIG. 1 is a side elevational view, partially broken away showing a cable assembly embodying the features of the present invention.

FIG. 2 is a sectional view taken along the line 2—2 of FIG. 1.

DETAILED DESCRIPTION OF PREFERRED EMBODIMENT

Referring to FIG. 1, a cable assembly 10 of the present invention comprises a conduit 12 and a core wire or inner cable 14 that slides longitudinally through the conduit. Core wire 14 can be a stranded cable or a solid wire, depending upon the application desired. In the illustrated embodiment, core wire 14 is a stranded cable, which is used for tension applications. A solid wire can be used for push-pull applications. Core wire 14 is of conventional construction.

Conduit 12 comprises an inner liner 16 formed of a suitable plastic resin preferably having a low co-efficient of friction. Liner 16 is surrounded by a reinforcing layer 18 formed of lay wires 20 arranged in a stranded helical configuration. The lay wires are surrounded by a protective jacket 22, which desirably is formed of an abrasion resistant plastic resin that is extruded or otherwise formed on the outer surface of the conduit.

Liner 16 is formed of a plastic resin having good tensile strength and shape retention characteristics, and a low co-efficient of friction and high "slip" characteristics. Suitable materials include high density polyethylene, nylon, acetal, Teflon (tetraflouroethylene) and PBT (polybutylene terephthalate). Acetal and high density polyethylene are especially preferred. In the control cable of the preferred invention, which is designed for automotive control cable applications, the liner has an inside diameter of 0.020 to 0.080 inches and preferably 0.045 to 0.070 inches. An inside diameter of 0.057 to 0.063 inches is especially preferred.

The range of outside diameters of the liner corresponding to the inside diameter range is 0.050 to 0.110 inches. A range of 0.075 to 0.100 inches is preferred and a range of 0.087 to 0.093 is especially preferred.

The jacket also is formed of a plastic resin, although rubber also could be used. The desirable characteristics of the plastic resin used for the jacket are abrasion resistance and toughness. Polyethylene, polyvinyl chloride (PVC), nylon, and polypropylene are desirable materials, with nylon and polypropylene being especially preferred. In the exemplary construction discussed above, the outer diameter of the jacket is 0.100 to 0.250 inches, with an outside diameter of 0.133 to 0.200 inches being preferred and an outside diameter of 0.165 to 0.175 inches being especially preferred.

A critical feature of the conduit is the lay wires forming the reinforcing layer in the conduit. It is critical that the reinforcing layer be quite flexible yet be of sufficient strength so that when the cable is bent into its desired configuration, the interior portion of the conduit will still form an oval opening that is of sufficient size to permit the core wire to slide easily in the conduit. If the lay wire reinforcing layer is of insufficient strength, the conduit will crimp and pinch and bind the sliding core wire, thus preventing the use of the cable for its desired purpose. A conduit of insufficient strength also is susceptible to pinching caused by impact penetration.

The reinforcing layer in the present invention is of a closed helix stranded wire configuration, wherein a plurality of parallel wire strands are wrapped in a contiguous helical pattern around the liner material. Whereas a conventional stranded wire reinforcing layer may comprise twenty (20) wire strands each having a diameter of 0.016 inches in a helical pattern having a wide range of pitches from 1.0 inch to 2.5 or 3.0 inches, and being formed of an oil tempered wire typically having a carbon content of SAE 1065, the present invention uses a softer, low carbon steel and employs more and thinner strands and a helical configuration having a specific pitch range. The wire strands are formed of SAE 1005 to SAE 1040 steel. With softer metal than 1005 steel, the conduit may have insufficient strength to resist penetration or deflection crimping. The higher limit to the range is established because higher carbon steel is too rigid and too expensive. A carbon content range of SAE 1008 to SAE 1030 is preferred, and a carbon content of SAE 1010 to SAE 1018 is especially preferred. Low carbon steel in these ranges is widely available commercially at very substantial cost savings over higher carbon steels, yet conduit formed of such steel has good strength characteristics, as well as good flexibility.

In order to achieve maximum flexibility with the low carbon steel construction of the present invention, relatively thin strand size is employed. While a strand thickness of 0.005 to 0.020 inches will work, improved flexibility is produced when a preferred range of 0.008 to 0.015 is employed. A range of 0.010 to 0.014 inches in diameter is especially preferred, and the ideal diameter is 0.012 inches.

The pitch at which the wires are wound on the liner is especially important in the present invention. If the pitch is too small, the wires act like a coil spring and permit the cable to be stretched. If the pitch of the strands is too long, the strength of the helical configuration is lost and the wire has inadequate resistance to penetration and deflection damage. The term pitch, in this reference, is defined in the conventional manner as the axial distance along the conduit for one complete wrap of a wire strand around the liner. A pitch of 2.00 inches to 0.750 inches is operable, but a pitch of 1.50 inches to 1.00 inches is preferred. A pitch of about 1.06 inches is especially preferred. In this construction the pitch angle is about 75°.

In order to achieve the wire diameter and pitch ranges of the present invention, a higher than normal number of wire strands is employed. The construction of the present invention employs twenty-one (21) to thirty (30) wires in the stranded wire conduit. Preferably, twenty-three (23) to twenty-eight (28) wires are employed and desirably the number of wires is about twenty-four (24). The high number of thin wires of low carbon steel provides exceptional flexibility while still providing a conduit of sufficient strength for contemplated application in the automotive industry or similar application. One preferred construction of one conduit according to the present invention is as follows:

Jacket:
OD: 0.165/0.175 inches
Material: Polypropylene
  Lay Wires:
Number of strands: 24
Diameter of strands: 0.012 inches
Material: SAE 1010–1018 steel
Pitch: About 1.06 inches (75°)
  Liner:
Inside diameter: 0.0575/0.063 inches
Outside diameter: 0.087/0.093 inches
Material: Acetal In constructing the conduit of the present invention, the lay wires are wrapped contiguously around the liner in a closed helix. The strength of the conduit is enhanced by insuring that the lay wires are wrapped snugly about the liner.

The foregoing preferred conduit, when tested against both a conventional stranded conduit employing hard (SAE 1065) wire strands, at 0.016 inches diameter using twenty (20) wires in the conduit, and a conventional braided conduit, proved to have substantially more flexibility than either cable and yet passed all strength and performance tests. In a test requiring a score (in Newtons) of 8.0 or less to indicate satisfactory flexibility the three cables scored as follows:

Braided—11,92N
Conventional hard wire stranded—14.68N
Soft wire stranded—6.58N

In the previous descriptions, various ranges are specified for type of steel, wire diameter, pitch, and number of wire strands. These ranges are to a substantial degree interdependent. For example, when a steel at an upper level of hardness is used (e.g., SAE 1040) and thicker wire strands of 0.020 inches or so are employed, the conduit will have adequate strength even if the pitch is between 2.0 and 3.0 inches or even somewhat greater. However with thinner strands of lower carbon steel (e.g., SAE 1018 steel at 0.012 inches diameter) the pitch should not be greater than 2.0 inches and preferably should be 1.5 inches or less. To achieve the desired pitch with this wire thickness a twenty-four (24) wire conduit is desirable. The number of wires required varies as a factor of liner diameter, pitch, and wire diameter. Acceptable ranges of various types of lay wire are set forth below:

| Wire SAE | Pitch for 0.008–0.015 Diameter Wire (inches) | Pitch for >0.015–0.020 Diameter Wire (inches) |
|---|---|---|
| 1005–1020 | 0.5–1.5 | 0.5–2.0 |
| >1020–1030 | 0.5–2.0 | 0.5–3.0 |
| >1030–1040 | 0.5–3.0 | 0.5–3.0 |

Pitch is described in terms of axial measurement in these examples. These measurements are intended to encompass the pitch angles that are produced when wrapping the lay wires around the liner of the preferred conduit construction specified above.

In the exemplary construction, the thinner, lower carbon content wire are preferred because of increased flexibility and lower cost. A low carbon steel such as SAE 1018 is readily available commercially at a diameter of 0.012 inches and is quite inexpensive. This wire produces cable with very desirable flexibility characteristics and good strength qualities when the conduit is constructed in accordance with the present invention.

While the invention has been described with reference to specific embodiments, it should be understood that various changes and modifications may be made in the arrangements and details of constructions of the embodiments disclosed herein without departing from the spirit and scope of the present invention, as defined in the appended claims.

The embodiments of the invention in which an exclusive property or privilege is claimed are defined as the following:

1. In a control cable assembly wherein a core wire is slidably mounted in a conduit, an improved conduit comprising:
   a tubular liner formed of a plastic resin surrounding the core wire;
   a stranded wire reinforcement layer surrounding the liner, the reinforcement layer comprising a plurality of parallel lay wire strands formed of low carbon steel having a carbon content of SAE 1005–1040, the strands being wrapped substantially contiguously in a helical configuration around the liner, the wire strands being 0.008 to 0.020 inches in diameter, the helical configuration having a pitch of 0.5 to 3.0 inches, the carbon content, diameter, and pitch being interrelated in the following manner:

| Wire SAE | Pitch for 0.008–0.015 Diameter Wire (inches) | Pitch for >0.015–0.020 Diameter Wire (inches) |
|---|---|---|
| 1005–1020 | 0.5–1.5 | 0.5–2.0 |
| >1020–1030 | 0.5–2.0 | 0.5–3.0 |
| >1030–1040 | 0.5–3.0 | 0.5–3.0 | and
   an abrasion resistant jacket surrounding the stranded wire layer.

2. A cable conduit according to claim 1 wherein the wire strands comprises SAE 1005–1020 wire having a diameter of about 0.008 to 0.015 inches, and the pitch of the wires is about 0.5 to 1.5 inches.

3. A cable conduit according to claim 1 wherein the wire strands comprise SAE 1005–1020 wire having a diameter greater than 0.015 to about 0.020 inches, and the pitch of the wires is about 0.5 to 2.0 inches.

4. A cable conduit according to claim 1 wherein the wire strands comprise wire having a carbon content of greater than SAE 1020 to about SAE 1030 and a diameter of greater than 0.015 to about 0.020 inches, with the pitch being 0.5 to 3.0 inches.

5. A cable conduit according to claim 1 wherein the wire strands comprise wire having a carbon content of greater than SAE 1020 to about SAE 1030 and a diameter of about 0.008 to about 0.015 inches, with the pitch being 0.5 to 2.0 inches.

6. A cable conduit according to claim 1 wherein the wire strands comprise wire having a carbon content of greater than SAE 1030 to about SAE 1040 and a diameter of about 0.008 to about 0.015 inches, with the pitch being 0.5 to 2.0 inches.

7. A cable conduit according to claim 1 wherein the wire strands comprise wire having a carbon content of greater than SAE 1030 to about SAE 1040 and a diameter of greater than 0.015 to about 0.020 inches, with the pitch being 0.5 to 3.0 inches.

8. A cable conduit according to claim 1 wherein:
   the pitch of the wire strands is about 1.0 to 1.5 inches; and
   the diameter of the wire strands is about 0.008 to 0.015 inches.

9. A cable conduit according to claim 8 wherein the carbon content of the wire strand is about SAE 1010 to 1018, the diameter of the wire strands is about 0.010 to about 0.014, and the pitch of the wire strands is about 1.5 to about 1.0 inches.

10. A cable conduit according to claim 1 wherein the wire reinforcing layer comprises twenty-one (21) to thirty (30) substantially contiguous wire strands having a diameter of 0.020 to 0.008 inches, with the helical construction having a pitch of 1.5 to 1.0 inches.

11. A cable conduit according to claim 1 wherin:
   the lay wires comprise about twenty-four (24) strands of steel wire having a carbon content of SAE 1010 to
   the diameter of the strands is about 0.012 inches; and
   the pitch of the helical configuration is about 1.06 inches.

12. A cable conduit according to claim 1 wherein: the lay wires comprise about twenty-four (24) strands of steel wire having a carbon content of SAE 1010 to 1018, the diameter of the strands is about 0.012 inches; and the pitch of the helical configuration is about 75°.

* * * * *

UNITED STATES PATENT AND TRADEMARK OFFICE
CERTIFICATE OF CORRECTION

PATENT NO.   : 4,898,046
DATED        : 02-06-90
INVENTOR(S)  : James M. Mancewicz; William R. Bosworth, Jr.

It is certified that error appears in the above-identified patent and that said Letters Patent is hereby corrected as shown below:

Column 1, line 7, delete "straned" and substitute --stranded--;

Claim 2, column 6, line 13, delete "comprises" and substitute --comprise--;

Claim 11, column 6, line 55, delete "wherin" and substitute --wherein--;
              line 58, after "to" insert --1018;-- and Claim 12, column 6, line 64, delete "," and substitute --;--.

Signed and Sealed this

Fourth Day of December, 1990

Attest:

HARRY F. MANBECK, JR.

*Attesting Officer*  *Commissioner of Patents and Trademarks*